Nov. 29, 1932.  M. WAGNER  1,889,506

SPRINGING FOR VEHICLES

Filed Nov. 28, 1931

Inventor
Max Wagner

Patented Nov. 29, 1932

1,889,506

UNITED STATES PATENT OFFICE

MAX WAGNER, OF STUTTGART, GERMANY, ASSIGNOR TO DAIMLER BENZ AKTIENGE-SELLSCHAFT, OF STUTTGART-UNTERTURKHEIM, A COMPANY OF GERMANY

SPRINGING FOR VEHICLES

Application filed November 28, 1931, Serial No. 577,848, and in Germany November 25, 1930.

This invention relates to an improvement in the springing of power driven vehicles, more particularly those in which the half axles carrying the vehicle wheels are arranged so that they can swing.

The invention is principally intended to obtain a simplicity of the springing of the half axles with the best swinging qualities such as have hitherto not been achieved. For this purpose, principally, unguided helical springs attached to the sprung parts without joints are provided which are practically completely free from friction and require no lubrication.

According to the invention the simplicity is achieved especially by the springs bearing directly against the frame so that the frame girders are not subjected to twisting stresses and thereby the hitherto necessary spring seats which with helical springs especially are very extended, are avoided. The longitudinal girders are not subjected to twisting stresses and consequently special strengthening is unecessary.

Furthermore a particularly advantageous arrangement of the springs which employs all the available space and a connection of the differential housing with the frame which takes up the horizontal shocks especially, are provided.

Figure 1:
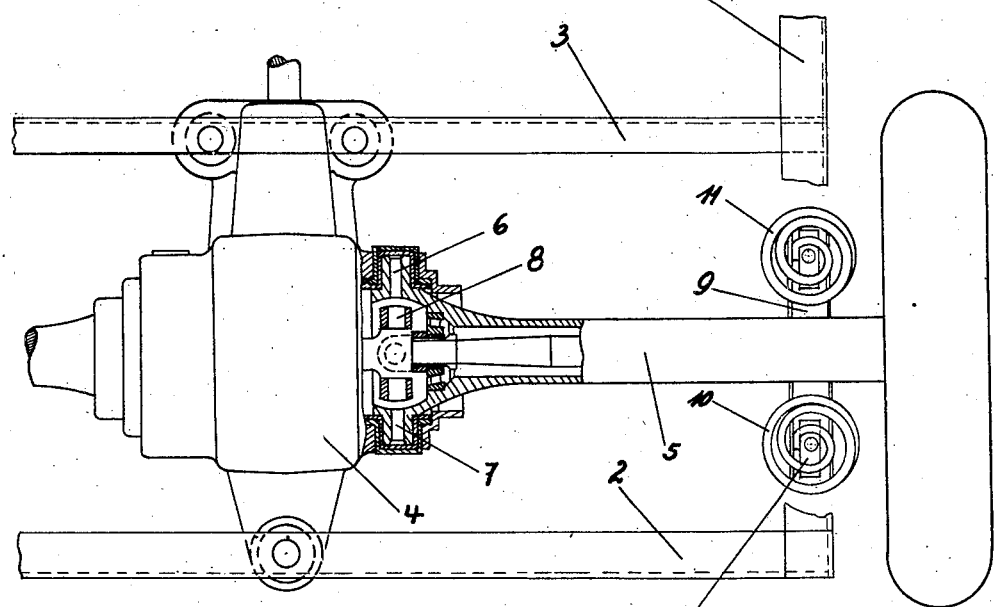
Figure 2:
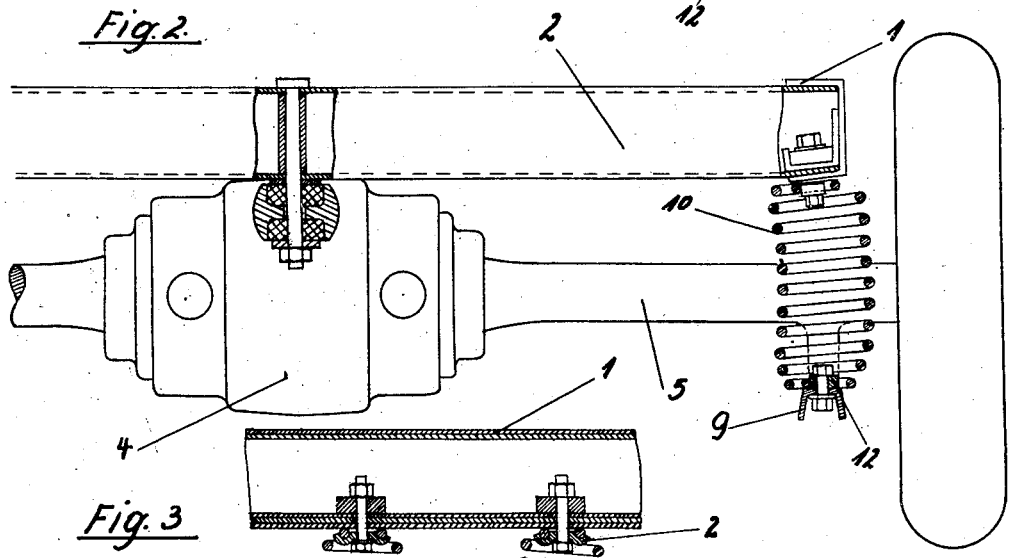
Figure 3:
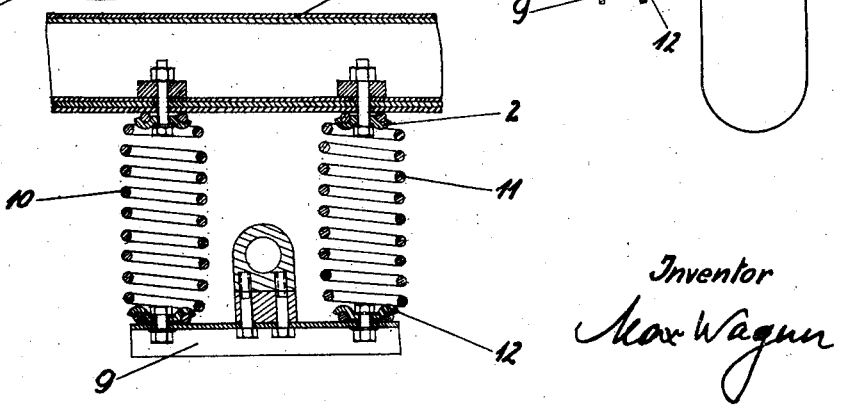

A constructional advantage of the invention is illustrated in the accompanying drawing, in which Fig. 1 is a plan view, Fig. 2 an end elevation and Fig. 3 a side elevation of an axle sprung according to the invention.

The cross members 2 and 3 of the frame to which the differential housing 4 is secured, for example with rubber buffers interposed, are attached to the longitudinal girder 1. The axle tube 5, is hinged to the housing by the journals 6 and 7, while the axle shaft is driven through the Cardan joint 8. The traverse 9, serving as an abutment for the helical springs 10 and 11 is secured to the axle tube 5. The other ends of the springs bear directly against the longitudinal girder 1 in such a manner that the spring forces do not produce any twisting stress on the frame. The springs are, for example, constructed without guides and secured to the frame or to the half axles without joints so that the windings can adapt themselves to the arc of swing and are prevented from rising from the abutments by locking pieces 12. In this way the springing is especially simple. Under certain circumstances, however, specially guided helical springs may also be used.

What I claim is:—

1. In a power driven vehicle, a chassis frame consisting of lateral longitudinal girders and transverse girders, a differential housing which is secured to the transverse girders of the chassis frame, a half axle receiving the drive for a vehicle wheel, a joint by which the half axle is jointed to the differential housing in such a manner that it can swing in a vertical plane and a helical spring substantially unguided having one end bearing against the axle and the other end directly against a longitudinal girder from below.

2. In a power driven vehicle, a chassis frame consisting of lateral longitudinal girders and transverse girders, a half axle carrying a vehicle wheel, a joint by which the half axle is connected with the frame, a traverse secured to the axle which on each side of the axle has a spring abutment and two helical springs each having one end bearing against one of the spring abutments and with the other end directly against a longitudinal girder from below.

3. In a power driven vehicle, a chassis frame consisting of lateral longitudinal girders and transverse girders, a differential housing which is secured to the transverse girders of the chassis frame, a half axle receiving the drive for a vehicle wheel, a joint by which the half axle is jointed to the differential housing in such a manner that it can swing in a vertical plane, a traverse secured to the axle which on each side of the axle has a spring abutment curved down under the axle, and two substantially unguided helical springs each having one end rigidly connected to one of the spring abutments and the other end directly with a longitudinal girder.

In testimony whereof I affix my signature.

MAX WAGNER.